April 19, 1955   J. ANDERSON   2,706,514
MANUFACTURE OF TENNIS BALLS
Filed Nov. 18, 1952
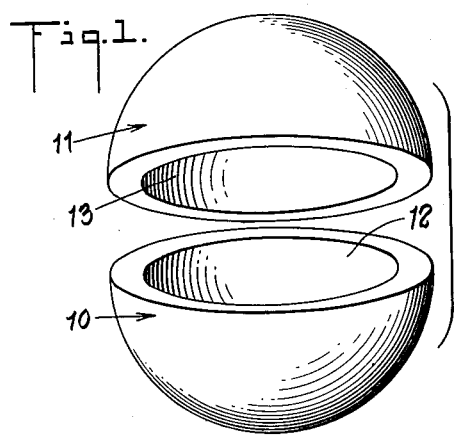
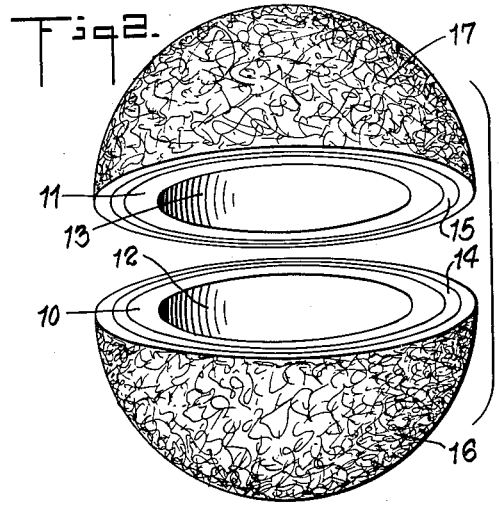
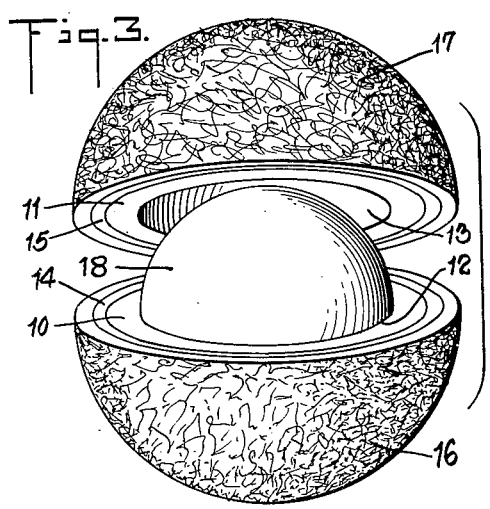
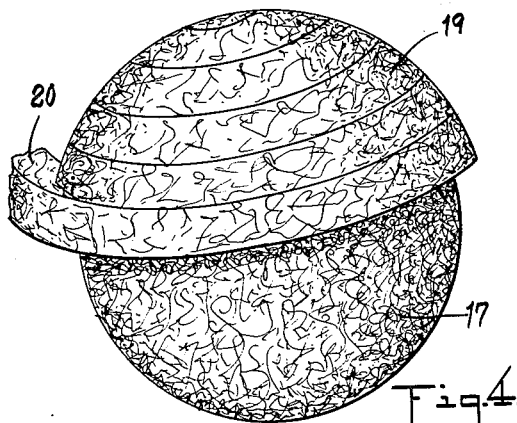
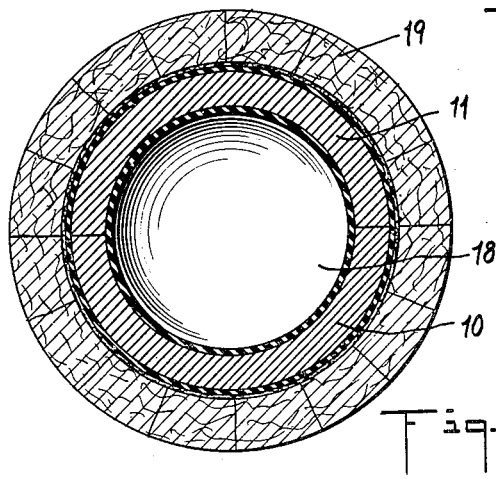
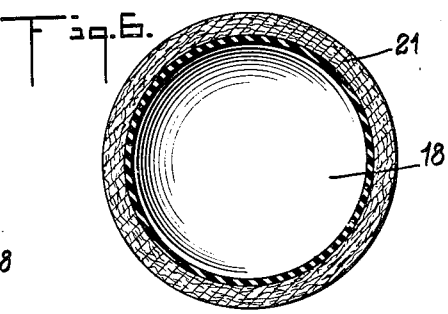
INVENTOR.
JOHN ANDERSON
BY Benj. T. Rauber
ATTORNEY

United States Patent Office 2,706,514
Patented Apr. 19, 1955

2,706,514

MANUFACTURE OF TENNIS BALLS

John Anderson, Sutton Coldfield, England, assignor, by mesne assignments, to Dunlop Tire & Rubber Corporation, Buffalo, N. Y., a corporation of New York Application November 18, 1952, Serial No. 321,285

Claims priority, application Great Britain December 8, 1951

8 Claims. (Cl. 154—16)

This invention relates to the manufacture of balls having a cover of felted fibrous material, particularly to tennis balls.

A conventional tennis ball comprises an inflated rubber core provided with an outer covering of woven and felted fabric having one or more seams. The prefelted fabric portions are stuck to and moulded on the core.

It is an object of the present invention to provide a method of making tennis balls which have a seamless cover and which have a longer useful life than the known balls.

According to the invention, a method of making a ball having an inflated core and a felted cover comprises applying a layer of feltable fibres to an inflated core carrying a surface layer of substantial thickness of a material which is removable in fluid form during felting, subjecting the fibres to a felting operation and simultaneously progressively removing the surface layer so as to allow the felting fibres to contract onto the core.

The material employed may be one which is removable by fusion, e. g. ice, or one which is soluble in a suitable solvent, preferably water, for example soap, glue, gelatine, sodium alginate or a cellulose ether.

Preferably a foamed material is employed so that the required thickness is obtainable with a comparatively small amount of material.

According to one method of carrying out the invention a mixture of skin glue, latex and soap in water is prepared, suitable proportions for such a mix being 12 parts by weight of soap, 20 parts by weight of skin glue, 3 parts by weight of latex and 65 parts by weight of water, though other proportions which will gel satisfactorily may be used. The mixture is agitated for about twenty minutes to form a foam and is then poured into hemi-spherical moulds containing spherical blanks positioned centrally by means of clamps and allowed to set for about 6 to 8 hours to form hemispherical mouldings. The mould sizes are such that the mouldings are 3½" in external diameter and their internal diameters are equal to the external diameter of an inflatable core for a tennis ball, that is to say, approximately 2⅜". Two such hemispheres after moulding are coated on their outer surfaces with a thin latex film and one layer of carded wool, the wool being thoroughly wetted by the latex to assist handling. Approximately one quarter of the weight of wool required for a finished ball is incorporated in this layer. The two hemispheres are then placed around a tennis ball core previously coated with rubber solution and the remaining wool in the form of a 1" wide strip required for a ball is wound on the hemispheres.

The assembly thus formed is wetted with water at a temperature of between 40° C. and 45° C. and pressure and friction are then applied to the wool for felting. The assembly is occasionally immersed in water during felting to wash the glue and soap from the surface of the wool layer. When the felting of the wool is complete, the soap has been removed, and a compact felted covering of even thickness has been formed on the surface of the core, the ball is washed in lukewarm water and dried. The ball is then immersed in naphtha, and after drying, moulded and vulcanised to final diameter under steam pressure, the moulding line being afterwards removed.

The weight of carded wool is determined by the amount required to produce a ball of the required weight with an allowance for loss in felting. The thickness of the soluble hemispheres is determined by the amount of shrinkage of the carded wool in felting.

As an alternative to the skin glue mixture a gelatine-soap mixture may be employed, or an inflated tennis ball core coated with a suitable adhesive may be enclosed in two hollow hemispheres of ice. A fine web of carded wool is then wound over the ice to the requisite thickness and after treatment with soap solution friction is applied to felt the wool.

As the ice melts the wool covering shrinks until it is completely felted to form a snug covering round the core. The ball is then finished by vulcanising in a mould as previously described.

The various stages in the formation of the covered ball are illustrated in the accompanying drawings in which:

Fig. 1 is a pair of hemispherical shells of the temporary or removable material, the two shells being shown in separated complementary positions;

Fig. 2 is a similar view of the shells after having been coated with an adhesive and then with a first layer of loose fibers;

Fig. 3 is a view similar to that of Fig. 2 but showing an inflated core mounted in the lower hemisphere, and the upper hemisphere in complementary relation to close about the core;

Fig. 4 shows the hemispheres assembled and a final layer of fibrous material being wound thereon;

Fig. 5 is a section of the completed ball prior to the fulling of the fibrous material and to the removal of the temporary enclosing support;

Fig. 6 is a sectional view of the tennis ball after the fibrous material has been shrunk and fulled and pressed about the core and with the temporary supporting layer removed.

Referring to Fig. 1 of the drawing, two hemispheres 10 and 11 having hollow centers 12 and 13 of the dimensions of a core are formed of a material which may be removed in liquid form, either by fusion or solution or dispersion in water or other liquid.

As described above these hemispheres may be made of a foamed aqueous dispersion of glue, soap and a small amount of dispersed rubber. The outer spherical surface of each of the hemispheres of Fig. 1 is then covered with a thin film 14 and 15 of latex and then with a layer 16 and 17 respectively of carded wool wetted by the latex. The resulting hemispheres in position to receive and cover a core are shown in Fig. 2.

As shown in Fig. 3, an inflated core of rubber 18 is fitted into the hemispherical recess 12 after being coated with a rubber solution. The upper hemisphere 11 is then pressed down onto the core 18 to form a completed ball comprising an inner core, a removable spherical layer and initial coat of carded fibers.

As shown in Fig. 4 a final layer 19 of carded fibers is then wrapped about the first layer 17, the wrapping being from a sliver 20 preferably of rectangular cross-section. The covered ball is now ready for the removal of the temporary shell formed by the two hemispheres 10 and 11 and the fulling and shrinking of the layers 17 and 19 to the final size ball during which operation the temporary shells 10 and 11 disappear or are removed by washing of fusion.

The section of the inflated covered ball preparatory for this is shown in Fig. 5, the covering 19 being the outermost covering, the two hemispheres 10 and 11 being within this covering and the inflated core 18 being innermost. The ball is now subjected to working in a soap solution which felts and shrinks the wool while at the same time removing the temporary shells 10 and 11.

The finished ball is shown in Fig. 6 with the fibrous material formed by layers 17 and 19 now shrunk to a uniform felted seamless cover 21 about and cemented to an inner inflated core 18. It will be apparent that during the working and washing or fusion steps the removable material of the shells 10 and 11 will be taken from the outer surface progressively as the fibrous covering 17 and 19 is fulled and shrunk, and that there will be uniform shrinking and fulling and placement of the fibrous cover on the inflated core.

Having now described my invention what I claim is:

1. A method of applying a felted fibrous cover to an inflated ball core which comprises enclosing said core in a shell of solidified liquifiable material, applying a layer of feltable fibers to the outer surface of said shell, liquefying said shell and removing it in liquid form while felting and fulling said fibers to a uniform seamless felted layer on said core.

2. The method of claim 1 in which said shell is formed of a foamed aqueous substance and is removed by dispersing in water.

3. The method of claim 1 in which said shell is formed of an aqueous dispersion of glue, soap and a small amount of latex.

4. The method of claim 1 in which said shell is fusible at a temperature at which said fibers may be fulled and shrunk and is liquefied and removed by melting.

5. The method of claim 1 wherein said shells are formed of ice and are liquefied and removed by melting.

6. A method of covering an inflated core with a seamless felted cover which comprises forming a pair of complementary hemispherical shells of liquifiable material, enclosing an inflated core in said shells, covering said shells with a layer of feltable fibers, liquefying said shells and removing them in liquid condition while shrinking said covering of fibrous material progressively as said shells are removed.

7. The method of claim 6 in which said shells are covered with a layer of feltable fibrous material prior to assembly on said core and in which an outer covering of feltable fibers is wound onto said assembled core, shell and initial covering of feltable fibers.

8. The method of claim 7 in which said cover of feltable material is pressed to a uniform compact structure after shrinking and fulling.

References Cited in the file of this patent

UNITED STATES PATENTS

| | | |
|---|---|---|
| 1,423,838 | De Gowin | July 25, 1922 |
| 1,479,266 | Trostel | Jan. 1, 1924 |
| 2,109,223 | Schmidt | Feb. 22, 1938 |
| 2,478,232 | Boynton | Aug. 9, 1949 |

FOREIGN PATENTS

| | | |
|---|---|---|
| 9,707 | Great Britain | 1893 |
| 352,200 | Great Britain | July 9, 1931 |